United States Patent [19]
Millspaugh

[11] Patent Number: 5,729,580
[45] Date of Patent: Mar. 17, 1998

[54] HYDROGEN ION ARRAY ACCELERATION GENERATOR AND METHOD

[76] Inventor: Gregory L. Millspaugh, P.O. Box 11106, Las Vegas, Nev. 89111

[21] Appl. No.: 745,697

[22] Filed: Nov. 12, 1996

Related U.S. Application Data

[63] Continuation of Ser. No. 279,256, Jul. 21, 1994, abandoned.

[51] Int. Cl.$^6$ ............................................. G21B 1/02
[52] U.S. Cl. ....................... 376/114; 376/115; 376/146
[58] Field of Search ................................. 376/100, 109, 376/114, 115, 116, 117, 120, 146, 151

[56] References Cited

U.S. PATENT DOCUMENTS

| | | | |
|---|---|---|---|
| 3,302,026 | 1/1967 | Mollon et al. | 376/116 |
| 4,568,509 | 2/1986 | Cvijanovich et al. | 376/109 |
| 4,935,194 | 6/1990 | Verschoore | 376/109 |

FOREIGN PATENT DOCUMENTS

| | | |
|---|---|---|
| 2-275397 | 11/1990 | Japan . |
| 3-68894 | 3/1991 | Japan . |
| 3-150494 | 6/1991 | Japan . |
| 90/10935 | 3/1990 | WIPO . |
| 90/14668 | 11/1990 | WIPO . |
| 90/15415 | 12/1990 | WIPO . |

OTHER PUBLICATIONS

J. of Fusion energy, vol. 9, No. 3, 1990, pp. 315–317, Besenbacher et al.
The Washinton Post, May 2, 1989, pp. A1, A7, article by P. Hilts.
J. Electroanal. Chem., vol. 266, (1989), pp. 437–450, Kreysa et al.
J. Radioanal. Nucl. Chem., Letters, vol. 137, No. 1, (Aug. 21, 1989), pp. 23–28, Horanyi.
J. of Nucl. Sci. and Tech., vol. 26, No. 7, (Jul. 1989), pp. 729–732, Ohashi et al.
Science, vol. 246, no. 4931, Nov. 10, 1989, p. 793–796, Miskelly et al.
UCRL–101583, Jul. 1989, Chapline, pp. 1–9.
Nature, vol. 340, Aug. 17, 1989, pp. 525–530, Lewis et al.
ORNL/FTR–3341, Jul. 31, 1989, pp. 2–15, Cooke.
Z. Phys. A. –Atomic Nuclei, vol. 333, (1989), pp. 139–320, Alber et al.
J. Radioanal. Nucl. Chem., Letters, vol. 137, No. 1 (Aug. 21, 1989), pp. 9–16, Faller et al.
Physics Letters B, vol. 228, No. 1, Sep. 7, 1989, pp. 163–166, Cribier et al.
Solid State Communications, vol. 72, No. 4, (1989), pp. 309–313, Hajdas et al.
Solid State Communications, vol. 72, No. 1, (1989), pp. 53–57, Shani et al.
Physical Review Letters, vol. 62, No. 25, Jun. 19, 1989, pp. 2929–2932, Ziegler et al.
Physical Review Letters, vol. 63, No. 18, Oct. 30, 1989, pp. 1926–1929, Price et al.
Z. Phys. B–Condensed Matter, vol. 76, No. 2, pp. 141–142, (1989), Schrieder et al.

(List continued on next page.)

*Primary Examiner*—Daniel D. Wasil
*Attorney, Agent, or Firm*—Rines and Rines

[57] ABSTRACT

A novel hydrogen ion array acceleration generator and method are presented wherein there is provided along a transversely extending diffusion/emission grid surface and within an evacuated contained environment, an array of hydrogen ions at the interstitial sites of the grid surface; such being electrically accelerated along a longitudinal direction substantially normal to said surface toward a transversely extending lattice surface of a heavy metal of atomic radius between about 1.23 and 1.31 Angstroms, and with matching of the interstitial sites on said grid surface with corresponding interstitial sites on the surface of said target lattice so as to bombard ions that may be already positioned at the corresponding target lattice surface interstitial sites; or, to penetrate into the target lattice to impact the hydrogen ion array pre-positioned in corresponding target lattice interior interstitial sites; or to insert an ion into such interior interstitial sites of the target lattice for future reaction with a bombardment ion.

29 Claims, 3 Drawing Sheets

OTHER PUBLICATIONS

Nature, vol. 344, Mar. 29, 1990, pp. 401–405, Salamon et al.

J. of Fusion Energy, vol. 9, No. 3, 1990, Myers et al, pp. 263–268.

NOVA Confusion in a Jar, transcript of show #1802 of Apr. 30, 1991, pp. 2–19.

"Cold Fusion: The Scientific Fiasco of the Century", Huizenga, Oxford Univ. Press, 1993.

C&EN, Jun. 14, 1993, Dagani pp. 38–41.

Taubes, "Bad Science: The Short Life and Weird Times of Cold Fusion", 1993, pp. 303, 425–428, 475–481.

HYDROGEN ION ARRAY ACCELERATION GENERATOR AND METHOD

This application is a file wrapper continuation of application Ser. No. 08/279,256, filed Jul. 21, 1994 now abandoned.

The present invention relates to the production and controlling of energy through the acceleration of an array of hydrogen ions, providing improved methods of and apparatus for producing and controlling energy, and, more specifically, improved hydrogen ion acceleration generators.

As such, the invention finds application wherever hydrogen ion generators are desired, as in any other systems requiring a hydrogen ion acceleration apparatus component.

BACKGROUND

All attempts, prior to 1989, to induce controlled fusion in a high temperature regime in magnetic confinement in Tokamaks or a high temperature regime in inertial confinement at experiments conducted at Los Alamos or Lawrence Livermore National Laboratories, and all prior experience with fission reactors and bubble chambers have shown that of the three potentially possible reactions:

has apparently never been seen in high-energy reactions, even though the known laws of atomic physics involving nuclear fission of large nuclei would indicate that the creation of an integral alpha particle (He4++) would be the preferred result, if the dynamics of the reactive system would allow it.

No previous fission reactor, bubble chamber, or controlled fusion work approached a situation other than a two-body center-of-mass system, even at the most elevated temperature and confinement times of controlled fusion experiments. Those high temperature and high confinement time fusion efforts were directed to inducing sufficient incoming momentum to cause a pair of the deuterons to approach each other close enough for the strong force to take effect, but no effort was even attempted to create a "rigid body" situation in such close proximity to the fusion process and fusion end products as to engender a quantum mechanical interaction with a crystalline lattice.

Turning, now, to the possible scientific basis of what has now been abundantly shown in this work, it is believed that the Law of Conservation Of Momentum prohibits the Helium-4 result in previous experimental results, because the reactions are always Two-Body Center Of Mass System (TBCOM) situations. In the prior results, there has been no "convenient receptacle" for the transmission of momentum left over from the collision of the incoming particles (commensurate with the energy released by the fusion reaction). Thus, the conservation of momentum has required the ejection of a lone particle, whether a proton or neutron, to carry off that momentum. The structures of the invention are useful with well-known earlier types of high-temperature reactions, being also dependent upon the physical chemistry of the interstitial sites of the lattice, and not especially upon the predominate large (heavy) metal chosen to produce the lattice. Chemical dopants deliberately introduced into the lattice will be useful only to the extent that such dopants induce ionic adjustments to the radii of the interstitial sites, and then only within the narrow range of radii immediately less than or greater to the ionic radius of the fusion target nuclei.

OBJECTS OF INVENTION

An object of the present invention is to provide a new and improved hydrogen ion acceleration generator of general utility, including also in the above-described high temperature fusion reactors.

Other and further objects will be explained hereinafter and are more particularly delineated in the appended claims.

SUMMARY

In summary, from one of its important viewpoints, the invention embraces a novel Hydrogen ion array acceleration generator and method of producing and controlling energy therein that comprises, providing along a transversely extending diffusion/emission grid surface and within an evacuated contained environment, an array of Hydrogen ions at the interstitial sites of the grid surface; electronically accelerating the array of ions along a longitudinal direction substantially normal to said surface toward a transversely extending lattice surface of a heavy metal of atomic radius between about 1.23 and 1.31 Angstroms; generating magnetic lines of flux along said direction between said diffusion/emission grid surface and target lattice surface; substantially matching the interstitial sites on said grid surface with corresponding interstitial sites on the surface of the target lattice; and controlling the acceleration of the said ions in an array from said diffusion/emission grid surface and the individual ion precession along said magnetic lines of flux to impact the Hydrogen ions array upon the corresponding target lattice surface interstitial sites so as to bombard ions that may be already positioned at the corresponding target surface or interior lattice interstitial sites or, if no such ion is already so positioned, to insert an ion into such surface or interior interstitial site of the target lattice for future reaction with a bombardment ion.

Preferred and best mode embodiments and design features are later presented.

DRAWINGS

The invention will now be described in connection with the accompanying drawings, FIG. 1 of which is a plan view of a preferred system (not to scale) operating in accordance with the technique underlying the invention to attain its improved results.

DESCRIPTION OF INVENTION

The present invention, as now to be described, embodies a demonstration of easily practiced art designed:

1.) To provide a novel technique and apparatus for Hydrogen ion acceleration and control for general use. In addition, the invention provides, under sound and well accepted theoretical principals, an operational environment which makes it possible for desirable modes of energy reactions including fusion-type reactions, to occur with regularity, subject to one or more methods of controlling the occurrence of such reactions, and the mode of fusion end products created, whether such method of control be by electronic manipulation of the stream, beam, or "plane wave" of Bombardment nuclei, by the manipulation of the physical chemistry of the interstitial site occupied by a Target Nuclei, or by physical means or processes whereby other interstitial sites are prepared or maintained in a condition chosen to facilitate or preclude fusion reactions that respectively are or are not desirable.

2.) To preclude, or assist in precluding, the undesirable modes of fusion reactions while increasing the rate of desirable energy reactions per unit of time, and per Bombardment Nuclei utilized;

3.) To increase the probability that any one Bombardment Nuclei will be directed on a trajectory which has been designed and controlled to result in a desirable energy reaction, thereby increasing the efficiency of the use of the deuterium or other fusion input, and further reducing the need for a post-fusion reaction products separation unit;

4.) To facilitate the removal of fusion end products from the target lattice, freeing needed surface and interior interstitial sites for further fusion reactions, thereby allowing the perpetuation of a steady-state power reactor for commercial uses;

5.) To provide precise control of the timing and rates of input of Bombardment Nuclei, the timing and rates of fusion reactions, the rate of energy production by fusion, and the timing and rates of expulsion of fusion end products.

Generally, the selection of the predominate "heavy metals" to be used in the target lattice, as well as the potential "dopants", for purposes of this application is defined as and is limited to metals, the atom or ion of which is electropositive in the unionized state and which has of an atomic radius greater than 1.23 Angstroms and less than 1.31 Angstroms. Metals of larger atomic radius will lead to interstitial sites that are too large resulting in a "loose" fit and the appearance of undesirable modes of energy reactions; while metals with smaller atomic radius will result in a lattice whose interstitial sites are too small to freely admit the diffusion of Hydrogen isotope ions into the interstitial sites for proper positioning, resulting in no reactions or only undesirable reactions.

This results in a short list of what has been above defined as "heavy metals" embracing the following metals as primary lattice metals or dopants: Aluminum, Gallium, Iridium, Molybdenum, Osmium, Palladium, Platinum, Rhenium, Rhodium, Ruthenium, Tungsten, and Zinc.

However, should free neutrons be released from fusion reactions through misadventure, loss of control or otherwise, neutron absorption would cause Molybdenum to transmute into Technician, and Aluminum into Silicon; either of these results could in turn cause a catastrophic failure of the target lattice, such that Aluminum and Molybdenum are not likely to be commercially desirable.

Before proceeding to more precise definitions of terminology employed herein and to operational and functional details, it is believed conducive to clarity of explanation first to discuss the structures in the drawings.

Figure 1:
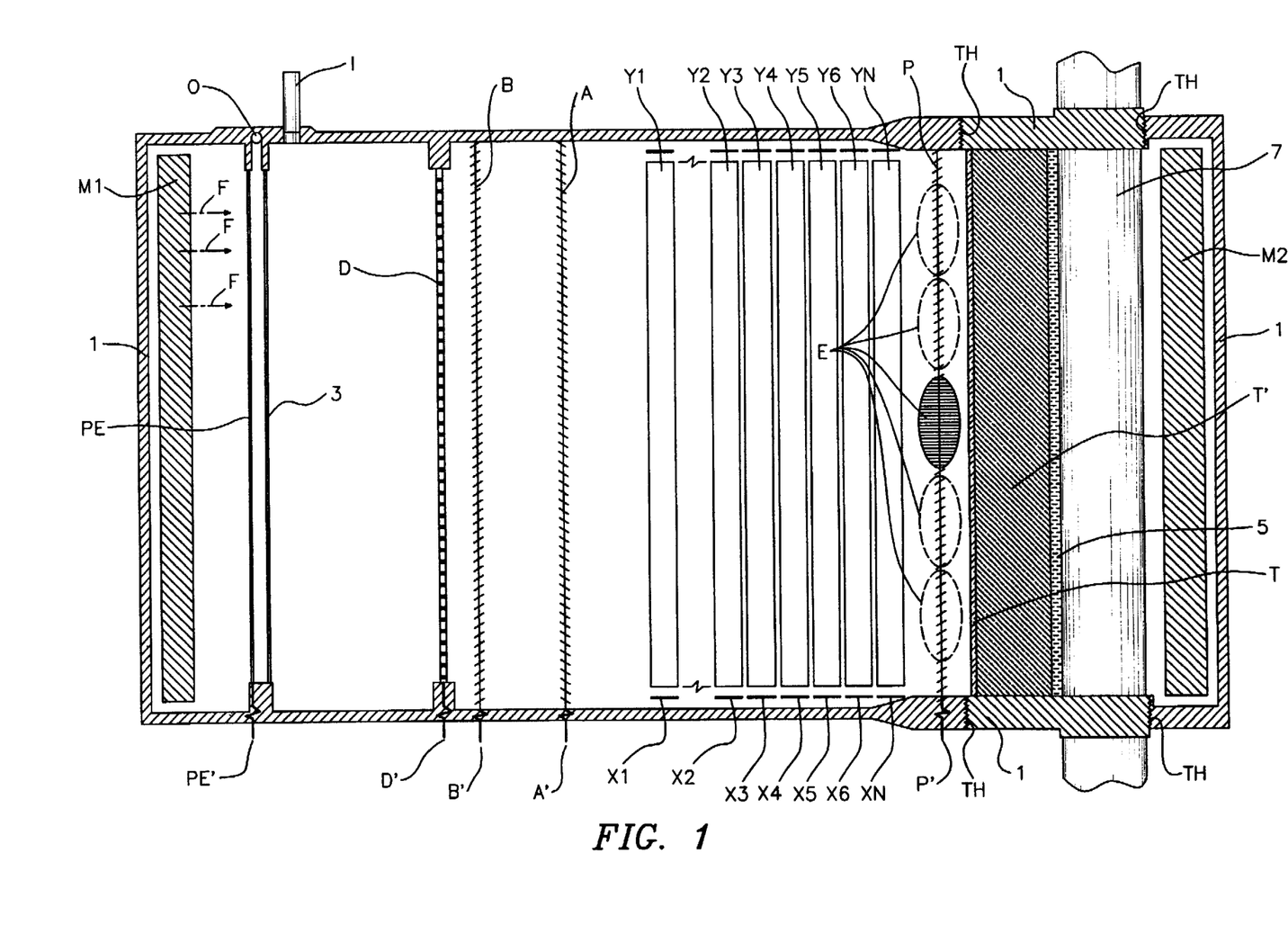
Figure 2:
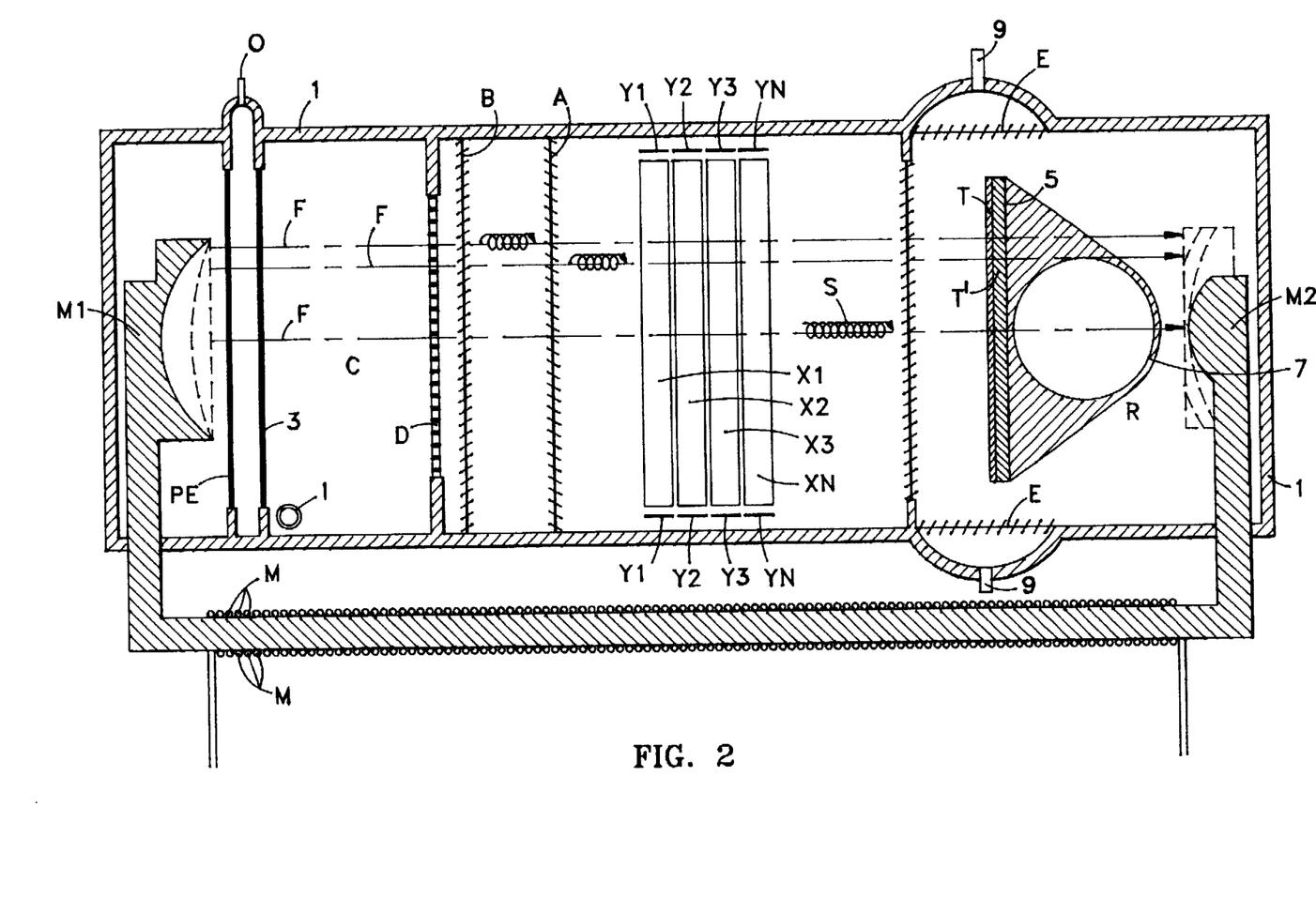
FIG. 2 is a side view of the same, also not to scale.

Referring to FIG. 1, a plan (not necessarily to scale) is shown of an energy generator or controlled fusion system constructed in accordance with the invention within a conventional containment-wall longitudinally extending housing 1 containing conformal magnetic field magnet pole pieces M1 and M2 at opposing ends (shown curved in FIG. 2, with dotted lines indicating possible geometry variations). The system components from left-to-right in the drawings are, in seriatum, a Platinum plate electrode PE extending transversely across the housing of the system for dissociation of heavy water and with a ceramic "flash protector" porous filter 3, bounding a chamber of heavy water solution or a deuterium ion vapor chamber C having an inlet I, with a heavy water dissociation Oxygen outlet at O if heavy water is used. A Palladium diffusion/emission grating or grid D follows, disposed also transversely across the housing, parallel to the electrode PE, as later described in detail, with a transverse bombardment control grid, also later defined, and acceleration control grid(s) shown at B and A, respectively, and with electrical connection terminals illustrated symbolically by zig-zag lines at the bottom in FIG. 1.

Next, there is provided a series of focus grids Y1, Y2 ... Yn along the top and bottom walls and a similar series of focus grids X1, X2 ... Xn along the side walls with respective electrical connection terminals at the sides, followed by an exhaust control grid E, more clearly shown at the bottom in FIG. 2, and a transversely extending expulsion grid P. The target lattice surface T also extends transversely across the housing 1, fronting the interior lattice T', parallel to the before-named diffusion/emission and acceleration control grids (and normal to the latter cited focus grids), and bounded by a hydrogen isotope migration barrier wall 5, along the righthand surface of which heat transfer pipes 7 and a refrigerant flow R are provided. For reasons later made more evident, the interstitial pattern and spacing of the diffusion/emission grating/grid D is chosen to match the interstitial pattern and spacing of the target lattice surface layer T. The barrier wall 5 may be plated or annealed to the target lattice T', with the same plated or annealed to the heat transfer pipe 7. The pipe and lattice unit may be threaded as shown at TH for replacement.

In FIGS. 1 and 2, furthermore, longitudinally or axially extending magnetic lines of flux created between the centrally symmetrically shown pole pieces M1 and M2 are designated by arrows F, so-labelled, and in FIG. 1, the magnetic field electrical windings for excitation are shown at the bottom at M. Helium exhaust ports 9 at the top and bottom are shown in concave wall sections in the region between the expulsion grid P and the target lattice assembly T–T', FIG. 2. The magnetic lines of flux F map the trajectory of bombardment deuterium ions from the diffusion/emission interstitial site (D) to the target interstitial site on the surface of the target lattice T. Such trajectory of bombardment deuterium ions is shown along the longitudinal axial direction in FIG. 2 as spiralling around the lines of flux F at S from the point of diffusion to the point of impact, proceeding as a two-dimensional array of deuterium ions to the target lattice.

Definitions and structural details of the components of the system of FIGS. 1 and 2 are now in order to be described.

ACCELERATION CONTROL GRID—(A in FIGS. 1 and 2)—One or a series of electrical conductors or semiconductors in the form of a thin foil or wire mesh capable of having an external voltage potential and current applied to it (zig-zag terminal shown at bottom of FIG. 1), accepting very large graduations of electrical voltage, with very short rise times, for the rapid switching of electrical potential strength and polarity and the transmission of electrical fields within the operational environment; permitting the passage of charged particles transversely through the grid; having the Normal surface vector of the acceleration grid parallel to the transit path of the charged particles. Used to increase the kinetic energy of bombardment nuclei to or above the threshold energy level needed to induce energy reactions, including fusion reactions, upon collision with target nuclei at T-T'.

BACKPLANE MIGRATION BARRIER WALL (5)—A layer of conventional barrier material plated, annealed, diffused, or otherwise imbedded upon the metallic crystalline lattice T-T' for the purpose of impeding, obstructing, or preventing the diffusion of any isotope of hydrogen or helium past such a barrier.

BOMBARDMENT CONTROL GRID (B)—One or a series of electrical conductors or semiconductors in the form of a thin foil or wire mesh capable of having an external voltage potential and current applied to it (zig-zag terminal at bottom, FIG. 1), accepting very large graduations of electrical voltage, with very short rise times, for the rapid switching of electrical potential strength and polarity and the transmission of electrical fields within the operational environment; permitting the passage of charged particles transversely through the grid; having the Normal surface vector of the control grid parallel to the transit path of the charged particles. Used to rapidly switch between two states; the first state to preclude the passage of positively charged particles through the grid, and the second state to create an electric field which rapidly attracts positively charged particles to the anterior face of the grid and then repels such particles past the posterior face of the grid, using extremely short rise times of voltage and extremely short durations of the second state.

BOMBARDMENT NUCLEI—ions of Hydrogen isotopes emitted from a control surface under controlled conditions, positioned in an array designed to maximize the probability of a fusion inducing collision, aimed, focused and accelerated into prospective fusion partners.

CONFORMAL MAPPING MAGNETIC FIELD (F)—A magnetic field (horizontal arrows in FIGS. 1 and 2) created by permanent magnets or switched electromagnets having shaped end-pieces, M1 and M2, such that the magnetic field lines created are longitudinally extending and perpendicular to the surface of the target lattice T-T' and perpendicular to the diffusion/emission grid D and/or the bombardment control grid B (when present), and which conformal map determines the transit path of positively charged bombardment particles from the diffusion/emission grid D and/or the bombardment control grid B (when present), to the surface of the target lattice T.

DIFFUSION/EMISSION GRID (D)—A thin metallic plate, foil, or film, capable of being maintained at an externally controlled voltage potential, including a zero voltage, whose metallic composition and metallic crystalline lattice geometry is chosen such that the composition of the diffusion/emission grid D will easily permit the diffusion of ions of Hydrogen isotopes through its interior, and further chosen such that the emission surface of the diffusion/emission grid D will have the diffusion sites upon its surface match the order, array, separation, and geometry of the metallic crystalline lattice geometry of the target lattice T-T', as before stated.

END PRODUCTS—Generally isotopes of Helium or Lithium created as the result of nuclear fusion reactions, occupying a site desirable to be vacated for the repositioning of a target nuclei.

EXPULSION CONTROL GRID (P)—One or a series of electrical conductors or semiconductors in the form of a thin foil or wire mesh capable of having an external voltage potential and current applied to it, accepting very large graduations of electrical voltage, with very short rise times, for the rapid switching of electrical potential strength and polarity and the transmission of electrical fields within the operational environment; permitting the passage of charged particles transversely through the grid; having the Normal surface vector of the control grid parallel to the transit path of the charged particles. Used to rapidly switch between two states; the first state to permit the free and unhindered passage of positively charged particles through the grid, the second state to create an electric field which attracts positively charged ions or electrically neutral atoms of end products to the anterior face of the grid and then repels such particles past the posterior face of the grid, using extremely short rise times of voltage and extremely short durations of the second state.

EXHAUST CONTROL GRID (E)—One or a series of electrical conductors or semiconductors in the form of a thin foil or wire mesh capable of having an external voltage potential and current applied to it, accepting very large graduations of electrical voltage, with very short rise times, for the rapid switching of electrical potential strength and polarity and the transmission of electrical fields within the operational environment; permitting the passage of charged particles transversely through the grid; having the Normal surface vector of the control grid parallel to the transit path of the charged particles. Used to rapidly switch between two states; the first state to preclude the passage of positively charged particles through the grid, and the second state to create an electric field which permits the rapid migration of positively charged ions or electrically neutral atoms of end products past the grid.

FOCUS GRIDS (X1-Xn; Y1-Yn)—One or a series of electrical conductors or semi-conductors in the form of a thin foil, plate, or wire mesh capable of having an external voltage potential and current applied to it, accepting very fine graduations of electrical voltage, with very short rise times, to adjust the focal plane of an array of charged electrical particles; having the Normal surface vector of the focus grid(s) perpendicular to the transit "plane wave" of bombardment nuclei of macroscopic linear measurement released from the diffusion/emission grid D, in contradistinction to prior art investigatory use of a beam of particles.

INTERIOR INTERSTITIAL SITE (T')—A site within the body of a metallic crystalline lattice T-T' capable of containing an ion whose ionic radius is small by comparison to the atomic radius of the metallic elements constituting the lattice.

SURFACE INTERSTITIAL SITE (T)—A site upon the surface boundary layer of a metallic crystalline lattice where an ion whose ionic radius is small by comparison to the atomic radius of the metallic elements constituting the lattice can be made to adhere to the lattice by ionic attraction, whether by the external application of a voltage potential to the lattice or in the absence of such an externally applied voltage potential. The "Surface Interstitial Site" is a point on the outer surface of a crystalline lattice which lies on a line normal to the surface and intersects the interior interstitial site created by the first and second outermost lattice layers of the crystalline lattice.

TARGET LATTICE (T)—A metallic or semiconductor crystalline lattice, as of the metals previously listed, chosen to afford an orderly array of surface interstitial sites which are receptive to the ionic binding of isotopes of hydrogen, where the constituent heavy metals of the lattice are chosen for the periodicity of the metallic lattice that will result, the inter-atomic distances between the "nearest neighbor" heavy metal atoms of the lattice, and the electro-potential of the metal lattice which is a measure of the propensity of the lattice to accept and retain ions of Hydrogen isotopes at interstitial sites upon the surface and within the interior of the lattice.

TARGET NUCLEI—Nuclei, ionized or not, chosen to react by nuclear fusion with bombardment nuclei, and positioned in an array designed to maximize the probability of a fusion inducing collision.

The features of the system and techniques employed in the present invention, will now be discussed commencing, first, with the controlled environment created by enclosing a volume of space, evacuating undesirable atmosphere, and introducing the controlled magnetic field F as in FIGS. 1 and 2. This thrust is designed to:

1) have its lines of magnetic flux F flow perpendicular to the surface face of the grating or grid structure D, etc., permitting the steady diffusion of Hydrogen ions through the same;

2) have such lines of magnetic flux F traverse the length of the enclosed volume to the surface of the target crystalline lattice T, where such magnetic flux is perpendicular to the surface face of that target lattice;

3) have the field strength, polarity, and alignment of such magnetic field F induce charged ion particles which are diffused, emitted, expelled, induced, or accelerated, from the surface face of the diffusion/emission grating/ grid D migrate as a two-dimensional array along, around, and about such lines of flux from surface interstitial diffusion sites on the diffusion/emission grating/grid D to corresponding surface interstitial sites on the surface face of the target lattice T, (which field strength and alignment may be adjusted, revised, modified, incremented, increased or augmented during the time of transit of the charged ion particles from the diffusion/emission grating/grid to the target lattice); and 4) have the field strength, polarity and alignment of such magnetic field F establish, and maintain, a one-for-one correspondence between the interstitial sites on the surface face of the diffusion/emission grating/grid D and the interstitial sites on the surface face of the target lattice T.

The controlled environment and construction of FIGS. 1 and 2 manipulates, induces, precesses, adjusts, accelerates and controls the trajectory of ions diffused, or otherwise released from the surface face of the diffusion/emission grating/grid D to a selected site on the surface face of the target lattice T, there to be inserted into the interstitial site of the target lattice for future reaction with a "bombardment" ion, or to be used for purposes of bombardment of an ion already positioned at the selected target lattice interstitial site.

Such manipulation, induction, precession, adjustment, acceleration and control of the trajectory of the ion in motion is accomplished by the series of magnetic fields F, with the electrical grids imparting voltage potential differences or electron current flows, whether of a direct current or alternating current, and radio frequency, microwave or optical frequency electromagnetic fields.

Such bombardment ions, moreover, are manipulated, induced into trajectories S, FIG. 2, precessed, adjusted in their trajectories, accelerated and controlled in concert with large numbers of similar ions subjected to the same forms of manipulation, induction, precession, adjustment, acceleration, and control; this being effected among an array of ions of macro-scopic cross-section, ordered pattern, and controlled dimension of length, width, and height of the array of ions.

Further in accordance with the invention, such bombardment ions are directed into prospective fusion reactions at interstitial sites on the surface face and between the outermost lattice layers of the target lattice T (avoiding or minimizing crystalline deformities created by Helium end products imbedded at interior interstitial sites), and where such surface and outer layer interstitial sites are prepopulated by controlled means with suitable nuclei to effect energy reactions, including fusion reactions, to intercept such bombardment ions.

The diffusion and emission grating or grid D, as of metallic or ceramic crystalline composition, whose chemical composition is chosen to create an orderly path of diffusion through the grating or grid by ions or neutral atoms of Hydrogen isotopes, while systematically excluding the diffusion of all atoms larger than Helium and varying in the degree to which Helium is allowed to diffuse, is disposed with its posterior surface face located opposite and facing the target lattice T. As previously stated, in accordance with the invention, it is chosen, designed, and metallurgically engineered to have a pattern of interstitial sites from which Hydrogen isotope ions are allowed to diffuse (and be emitted into open space) matching the pattern of interstitial sites located on the surface face of the target lattice T.

With the invention, furthermore, enhanced control of low temperature energy reactions, including fusion reactions, is achievable through the use of the before-described back plane Hydrogen isotope ion migration barrier wall 5—a boundary layer, coating, or plating, which is applied, or a foil or plate which is bonded, annealed, or plated, to the rear and side walls of the target lattice T. Optionally, as later explained, from one to five sides of a six-sided regular polyhedron; or optionally from one to N−1 sides of an N-sided polyhedron. Such is chosen to prohibit, retard, or obstruct the diffusion, effusion, migration, transmigration, drift, motion, acceleration, precession, movement, or "Brownian Motion" of ions or neutral atoms of Hydrogen or Helium isotopes, through or out of the treated face of the crystalline lattice T–T' which is used, or intended, for the inducement of energy reactions, including fusion reactions, and including, but not limited to, the pure elements or molecular compounds of Beryllium, Boron, and Carbon.

Figure 3A:
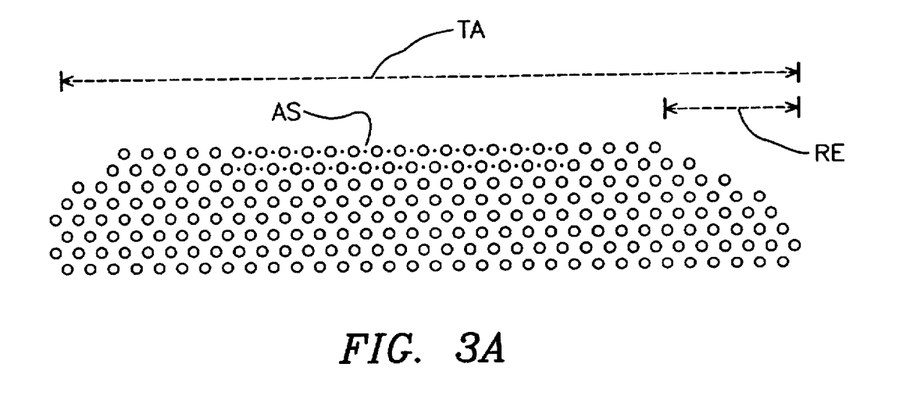
FIGS. 3A and 3B are fragmentary views respectively illustrating target lattice erosion effects and a preferred target lattice geometry for obviating the same.
Figure 3B:
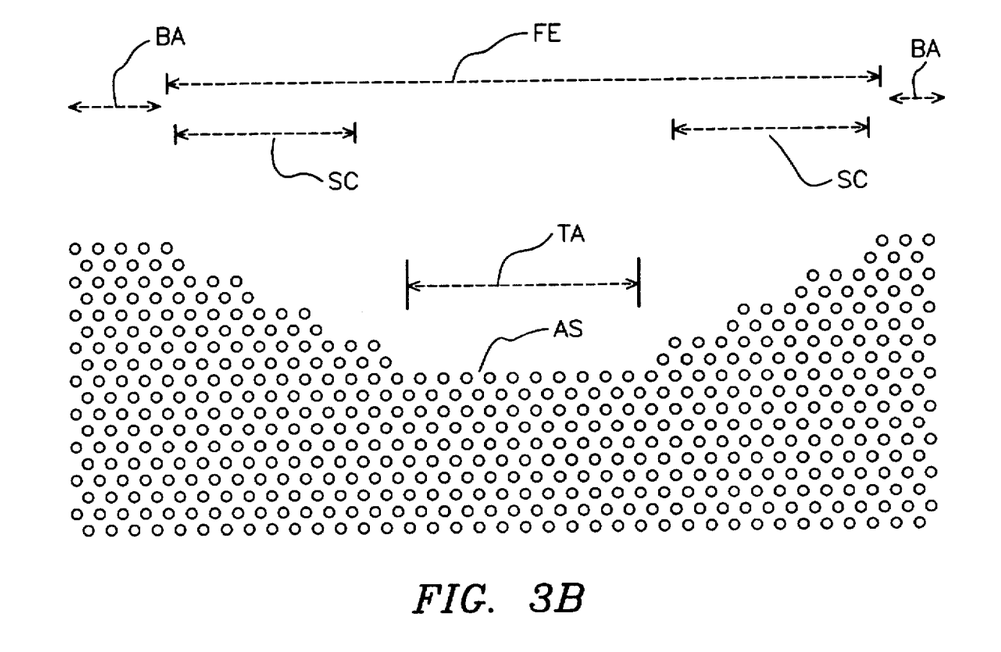

The sides 11 (FIG. 1) of the target lattice T–T' are preferably shaped (as an aerial view) as a partially completed Egyptian pyramid, FIGS. 1 and 3; with receding steps of target lattice material with the sides and steps of the lattice, as mentioned, further treated with carbon or other diffusion preventatives. The prospectively active portion of the front surface layer of the lattice T will be intentionally etched, FIG. 3B, into a depression of several atomic layers thick, below the plane of the "inactive" portion of the front surface, during the manufacturing and testing process for reasons later discussed.

Enhanced control of low temperature energy, including fusion reactions, under the principals of the present invention is additionally achievable with the conformal mapping magnetic field concept. The magnetic field F created by the permanent magnets or electromagnets M1, M2, having flat, planar pole pieces or pole pieces which are correspondingly concave and convex, creates lines of magnetic flux that are perpendicular (or nearly perpendicular) to the surface face of the diffusion (and emission) grating or grid D at the points of entering (and leaving) that grating or grid on the face of the grating or grid which is opposite to and facing the target lattice T–T'. The magnetic lines of flux F remain perpendicular (or nearly perpendicular) to the surface face of the target lattice T at the points of entering the face of the target lattice T–T' which faces the diffusion (and emission) grating or grid D for the beneficial purposes previously explained wherein the magnetic lines of flux induce or will induce an electrically charged particle or ion to precess about such line of flux from an interstitial site where the particle or ion was diffused or emitted to a corresponding interstitial site on the surface face of the target lattice T–T'. As before stated, moreover, these magnetic lines of flux induce such precession by an array of similar particles or ions each of which is precessed during its trajectory from the site of its diffusion or emission to its uniquely corresponding interstitial site on the surface face of the target lattice T. Such rotational precession S, FIG. 2, of the two-dimensional array of bombardment particles (bullets) diffused from an array of interstitial sites about the magnetic lines of flux (rifling) carries the bombardment particles (bullets) into a corresponding two-dimensional array of interstitial sites on the surface of a target lattice T containing target nuclei (bullseyes) at such surface interstitial sites and the outermost interior interstitial sites located directly behind such surface interstitial sites.

The use of the focus grids (X1 . . . Xn; Y1 . . . Yn) in the preferred system of the invention—one or a series of flat plates, films, wiremeshes, or wires, composed of a combination of metals, ceramics, and/or semiconductors, placed at spaced intervals, on opposite sides of the operational environment, where the Normal vector of the grids is perpendicular to the predominate direction of the trajectories of the array of charged particles or ions, along one or two cartesian planes provides further control features. As schematically shown, each grid may have a width the same as, or different from, any other focus grid, which width is calculated and designed to impart an electromagnetic acceleration upon particles or ions of selected mass for a chosen duration of the particle's or ion's trajectory, and which width is designed to impart the same direction and intensity of acceleration to the entire array of similar particles or ions, retaining the order and pattern of the array while shifting, directing, or precessing the particles or ions comprising the array. Similar comments apply to the use of the acceleration grid A—one or a series of flat plates, films, wiremeshes, or wires, composed of a combination of metals, ceramics, and/or semiconductors, placed at spaced intervals, along the intended trajectory of a bombardment particle or ion, generally perpendicular to the trajectory; each grid having a width the same as, or different from, any other acceleration grid, which width again is calculated and designed to impart an electromagnetic acceleration upon particles or ions of selected mass for a chosen duration of the particle's or ion's trajectory, and which width is designed to impart the same direction and intensity of acceleration to the entire array of similar particles or ions, retaining the order and pattern of the array while increasing or retarding the velocity of the particles or ions as an array.

Little has been said earlier as to the function of the end products expulsion control grid P, which again may be one or a series of flat plates, films, wiremeshes, or wires, composed of a combination of metals, ceramics, and/or semiconductors, this time placed at spaced intervals in front of the target lattice T. This grid P is for the purpose of impressing upon the target lattice T an electrical voltage potential, alternating current fields, radio frequency, microwave, or optical frequency electromagnetic fields for the purpose of stimulating the diffusion or emission of Helium and other energy reaction, including fusion reaction, end products; from the surface and outermost interior layers of the target lattice T, this, whether by inducing elevated energy states of the electrons comprising the atomic shells surrounding the end products, including ionization of the end products, or imparting an acceleration to the energy reaction, including fusion reaction, end products directly through the nuclear magnetic moments (see dotted trajectories to left of grid P). This expulsion grid P also cooperates with the before-described control grid E, more fully illustrated in FIG. 2. The exhaust control grid E again may be one or a series of flat plates, films, wiremeshes, or wires, composed of a combination of metals, ceramics, and/or semiconductors, placed at spaced intervals in front of orifices in containment wall sections between the expulsion control grid P and the target T–T' in the operational environment along the sides of the target lattice. It is designed to maintain an electrical voltage potential which precludes, prohibits, prevents or retards the wasteful loss of particles or ions desired for controlled energy reactions, including fusion reactions, being capable of being rapidly switched in voltage and polarity to facilitate the attraction of an energy reaction, including a fusion reaction, end product away from the target lattice T and to expel such energy reaction products, including fusion reaction products, through the exhaust orifices 9.

For the purposes of the invention, moreover, and as before mentioned, chemical dopants may sometimes be usefully employed in the target lattice structure T–T'.

The use of Gallium, Iridium, Molybdenum, Osmium, Palladium, Platinum, Rhenium, Rhodium, Ruthenium, Tungsten, and Zinc to effect a modification of the ionic distances between adjacent atoms comprising the body of a metallic crystalline lattice T–T' may be beneficial. Such metals are chosen to so modify the previous existing ionic distances between adjacent atoms as to establish the effect of a highly inelastic collision between such adjacent atoms and a nuclei of a Hydrogen (or Helium) isotope ion situated between or among such atoms comprising the metallic crystalline lattice T when the Hydrogen isotope nuclei reacts with another nuclei by the process of an energy reaction, including a fusion reaction (or when the Helium isotope nuclei as an end product of an energy reaction, including a fusion reaction, recoils from the incident momentum of the predecessor nuclei). Such dopant use may be indicated where the adjustment of the ionic distances within the lattice so changes the nature of collisions between:

a) the atoms comprising the metallic crystalline lattice T', and b) the Hydrogen isotope nuclei undergoing energy reactions, including fusion reactions (or the Helium isotope nuclei end product of an energy reaction, including a fusion reaction, recoiling from the incident momentum of the predecessor nuclei), with c) the collision being changed in character from a predominately elastic collision into an inelastic collision, resulting in the expression of the final energy reaction products, including fusion reaction products, appearing all or predominately in the form of Helium-4 (desirable case (c), first above-mentioned); but not extending to the use of Palladium or Platinum as the original (and predominant) constituent of such a metallic crystalline lattice T–T'.

The previously alluded to process of introducing nuclei of Hydrogen isotopes into the interior interstitial sites of the metallic crystalline lattice T' for the purpose of inducing a greater degree of rigidity to the lattice, reducing or eliminating the capacity of the lattice to respond elastically to collisions by Hydrogen isotope nuclei (or Helium isotope nuclei) which bombard the lattice, or have been bombarded by other nuclei (or are the end products of an energy reaction, including a fusion reaction, recoiling from the incident momentum of the predecessor nuclei) and are rebounding into the lattice, is of considerable importance. In general, all interior interstitial sites which intended to be chosen as "active sites" for the introduction of subsequent bombardment nuclei should be prepared in advance by inducing an ion of the Deuterium isotope of Hydrogen into such interstitial sites.

This is not a desirable process to be used for interstitial sites "deep" within the interior of the target lattice T'. These latter sites should be prepared in advance by a two-stage process of immersion of the target lattice T' in a hyperbaric atmosphere of, for the first stage, the mono-proton isotope of Hydrogen (no neutrons in the nucleus). This is true wherever sites are deemed undesirable for the purpose of inducing nuclear fusion reactions for reasons of probable crystalline deformation by unremovable imbedded Helium isotope end products. The second stage of the immersion of the target lattice T' in a hyperbaric atmosphere should use the deuterium isotope of Hydrogen for the proper pre-conditioning of those interstitial sites on or close to the "active" surface of the target lattice T'.

Further to reduce crystalline stress and deformities within the target lattice T–T', the before-mentioned coating with graphite upon the target lattice across its sides and posterior surface is intended to bond, or otherwise attach, to the heat transfer pipe, channel or device 7, intended to draw heat from the reaction target lattice T–T'.

It is now in order to discuss further details of the integrated heavy water chemical dissociation cell C for the electrical dissociation of Hydrogen from Oxygen, designed with an anode electrode PE composed of Platinum, Palladium, Gold, Silver, or Copper located near the anterior wall of the cell C; and with the diffusion electrode D, composed primarily of Palladium (with suitable dopants to match the metallurgy of the target lattice T–T') serving as cell cathode and capable of being impressed with varying electrical voltages to induce or retard the emission into the controlled environment of Hydrogen ions which have diffused through the electrode (grating/grid) D. Appropriate voltage and current control mechanism maintains the electrical dissociation potential difference between the dissociation cathode and anode (D-PE) which controls the rate of dissociation, ergo the rate of ions available for introduction into the controlled environment; while the diffusion electrode D is impressed with varying electrical voltages relative to the bombardment control grid(s) B to retain diffused Hydrogen isotope ions on the posterior surface of the dissociation/emission cathode/grating/grid until the time chosen to initiate an array of bombardment ions on their trajectories to the target lattice T–T'.

The before-mentioned ceramic filter 3, with small orifices of a size large enough to permit the diffusion of Heavy Water and ions of Oxygen or Hydrogen when in aqueous solution, contacts the interior of the chemical dissociation cell, dividing the space containing the cathode from the space containing the anode; this prevents the accidental admixture of ionic Hydrogen and ionic Oxygen in the gaseous state. Further refinement would contra-indicate the use of Palladium in the anode, as use of Palladium would subject the cell to the inherent propensity of Palladium to adsorb ionic Hydrogen as it is dissociated from the Heavy Water. This would then lead to a "side reaction" in which Oxygen collecting at the anode would recombine with traces of Hydrogen which adsorbed into the anode and was later released. This "side reaction" would be purely a chemical reaction, but would lead to a heat build-up within the cell which would throw off the anticipated linearity of the rate of ions available for introduction into the controlled environment as a function of the dissociation current impressed between anode and cathode (PE-D).

The previously described electrical pulsing for the operation of the various electrodes and grids, etc., may be effected by an electrical pulse control system, centrally controlled by an analog electronic circuit, or digital computer with suitable programming, to induce a series of electrical voltages, alternating currents, radio frequency, microwave and/or optical frequency electromagnetic fields to induce the following behavior among the array of Hydrogen isotope ions:

1) Retaining a constant voltage potential difference between the cathode D and anode PE of the chemical dissociation cell C while varying the dissociation current between the cathode D and anode PE, and while varying the voltage applied to the cathode diffusion electrode D relative to the bombardment control grid(s) B;

2) Imposing a positive polarity and net electrical voltage upon the bombardment control grid(s) B relative to the voltage appearing on the diffusion electrode D, to prevent, retard, or impede the emission of Hydrogen isotope ions from the surface of the diffusion electrode;

3) Selectively choosing the time, voltage, and duration of transient electrical states where:
   (a) the bombardment control grid B is made highly negative and then electrically neutral relative to the diffusion electrode D;
   (b) the acceleration grid(s) A is (are) made highly negative and then electrically neutral (and as ions pass in their trajectories to the posterior of each such acceleration grid, each such grid made highly positive) relative to the bombardment control grid B, suitable to impart such velocity to an array of Hydrogen isotope ions as to induce occurrence of nuclear energy reactions, including fusion reactions;
   (c) opposing focus grids X1 ... Xn and Y1 ... Yn are made oppositely negative and positive, then electrically neutral, relative to the electrical charges of the Hydrogen isotope ions;
   (d) the magnetic field strength of the conformal mapping field F is increased or reduced to align or realign an array of Hydrogen isotope ions with the interstitial sites of the diffusion electrode D or the interstitial sites of the target lattice T, whether such array of Hydrogen isotope ions is adhered to the diffusion electrode D, adhered to the target lattice T, or in motion in a trajectory S between the diffusion electrode D and the target lattice T;
   (e) the series of electrical voltages, alternating currents, radio frequency, microwave and/or optical frequency electromagnetic fields stimulates, attracts or repels Helium nuclei from positions adhering to the surface interstitial sites of the target lattice T, (and further stimulates, ejects, or removes Helium nuclei from interior interstitial sites T' located in the outmost lattice layers of the target lattice T), and into open space near the exhaust orifice 9;
   (f) where the series of electrical voltages, alternating currents, radio frequency, microwave and/or optical frequency electromagnetic fields stimulates, attracts or repels Helium nuclei from positions in open space to and through the exhaust orifice 9;
   (g) steps 1) through 3(b) above are repeated; with the acceleration imparted to the array sufficient to induce the Hydrogen isotope ions to reach the surface of the target lattice T at corresponding surface interstitial sites and adhere thereto, or to penetrate to the interior interstitial sites T' immediately behind the surface interstitial sites T, while being insufficient acceleration to induce nuclear energy reactions such as fusion reactions or to induce a Hydrogen isotope ion to penetrate further into the target lattice than the intended "active" interstitial site; and further repeating steps 3(c) and 3(d) above; and (h) steps 1) through 3(g), above, are recycled while maintaining a controlled flow of refrigerant R sufficient to maintain a steady temperature within the target lattice T–T' and prevent heat-induced distortions and malformations of the target lattice.

The system described in connection with the embodiments of FIGS. 1 and 2 and its multiple enhancements, in summary, has the following sequence of operation.

The system is designed to include the integrated Heavy Water Dissociation cell C, using electrical current at a voltage great enough to chemically dissociate Muonic Hydrogen and naturally occurring Hydrogen (including the isotope of Deuterium) from the Oxygen, while keeping the voltage below the level which would ionize the Muon from the proton in the Muon Hydrogen. This integrated dissociation cell uses the diffusion/emission grating/grid D as the dissociation cathode electrode to which isotopes of Hydrogen and Muonic Hydrogen—all referred to herein and in the claims generally as hydrogen ions—are drawn by electric potentials.

The intended bombardment nuclei (isotopes of Hydrogen or Muonic Hydrogen) would be positioned by diffusion through the diffusion/emission grating/grid D to an interstitial site on the emission surface, and there kept from being emitted by a positive electrical field on the bombardment control grid B until the device is ready to be operated through a complete cycle. The position of each nuclei at an interstitial site on the surface awaiting emission will correspond to the spacing of target nuclei waiting at the interstitial sites of the target lattice T.

At the chosen point of time, the bombardment control grid B is switched to having a negative electrical potential, keeping the voltage gradient low enough to prevent the ionization of any Muons from the nuclei of Muonic Hydrogen. As nuclei approach the bombardment control grid B, it is switched to a neutral potential and after the nuclei have passed, the grid is switched back to a positive electrical field.

The acceleration grid(s) A is (are) then switched in turn from a rest state at zero potential, to a negative potential until the nuclei approach (providing a pulling acceleration), back to a zero potential as the nuclei pass, then to a positive potential (providing a pushing acceleration). If more than one acceleration grid is used, each is switched in its own turn, keeping the voltage pulse gradients of each grid, and the combined pulse gradients of adjacent grids low enough to prevent an unintended ionization of Muonic Hydrogen.

As the nuclei accelerate, it is recognized that Muonic Hydrogen (if any is present) will be accelerated by all forms of electrical and magnetic fields less than ionized isotopes of naturally occurring Hydrogen. This will be due to the fact that the naturally occurring Hydrogen ions will have an effective electrical charge of +1 from the sole proton; however the Muonic Hydrogen will have a greatly reduced effective charge because of the shielding effects of the Muons negative electric charge cloud surrounding its proton. All translational accelerations in all directions, however, will be reduced by the same extent, such that the velocity of Muonic Hydrogen can be left much lower than naturally occurring Hydrogen ions and still accomplish a desired fusion reaction. The timing pulses of each grid must allow for a delay (by advancing or retarding the change of voltage state) to compensate for the lower velocity of the Muonic Hydrogen.

Once the nuclei have obtained the desired velocity, the series of focusing grids, X1, etc.–Y1, etc. located on opposite sides of the "Operational Environment" will have opposite electrical fields (keeping the voltage pulse gradients of each grid, and the combined pulse gradients of adjacent grids low enough to prevent an unintended ionization of Muonic Hydrogen) to induce alignment of the entire array of bombardment nuclei with the array of surface interstitial sites on the target lattice T.

The bombardment nuclei will be directed in matching trajectories to the interstitial sites of the target lattice T through the additional use of the Conformal Mapping Magnetic Field F. This magnetic field will use, as before stated, combinations of permanent magnets, and electro-magnets, with flat or shaped pole pieces (M1, M2, etc.) to align the trajectory from the diffusion/emission grating/grid D to the target lattice T. The magnetic field lines F will be generally aligned longitudinally parallel to the bombardment trajectories, inducing the previously described spiralling effects to the trajectories of each of the bombardment particles, and intended to assist in overcoming internal repulsion of the bombardment particles in the array as they proceed in flight. This corrective measure is taken to offset the vertical and horizontal "spreading" of the array of bombardment nuclei which otherwise occurs because of their mutual repulsion created by the positive Coulomb charge of each nuclei.

The bombardment nuclei (and late arrival Muonic Hydrogen) then impact with awaiting nuclei located at the interstitial sites on the target lattice T. When the fortuitous circumstance of having Muonic Hydrogen at either the target site or among the bombardment nuclei occurs, extra benefit is received. Each target interstitial site on the surface and in the outermost layers of the target lattice is populated in advance to insure that all possible fusion reactions take place, and to further insure that bombardment nuclei do scatter as little as possible into the depths of the interior of the target lattice T.

The rigidity engineered into the lattice of the present invention facilitates the transmission of energy and momentum from the fusion end products into the lattice in the form of heat, which is then beneficially drawn off through the use of a refrigerant R and a series of heat transfer piping, heat exchangers, and turbines at 7.

Special coatings 5 on the rear and side faces of the target lattice T–T' reduce or eliminate the diffusion of hydrogen iso-tope nuclei whose loss would reduce the rigidity of the lattice for use in future fusion reactions. Other coating on the rear face of the target lattice reduce lattice stress and deformations due to the effects of extended exposure to high temperatures. Small translational shifts of the target lattice on the heat transfer pipe (in response to lattice stress) are offset by fine tuning of the translational effects of the focus grids.

Once the fusion reactions have taken place (allowing a time delay for the lower velocity Muonic Hydrogen) the Expulsion Control Grid P is pulsed with a series of direct current voltage potentials, alternating current voltages at radio frequency, microwave, and/or optical frequencies to dislodge all fusion end products (including Hydrogen nuclei which failed to react by fusion) from their adhesion to the surface layer, and occupation of interstitial sites in the outermost layers, of the target lattice; keeping the voltage pulse gradients of the Expulsion Control Grid low enough to prevent an unintended ionization of Muonic Hydrogen. As the fusion end products are drawn away from the surface of the target lattice T–T, the pulsed Exhaust control grids P exhaust the end products to a separation unit and, if desired, a subsequent stage "Operational Environment" or recycling into the input side of the diffusion/emission grating/grid D, schematically represented by the dashed line "Recycle" in FIG. 1.

Thus the system is also designed to operate with the diffusion/emission grating/grid D supplied by an external chemical dissociation cell, or by the refined products of a preceding stage "Operational Environment", wherein the hydrogen isotopes and Muonic Hydrogen which were used as target or bombardment nuclei in the first, or a previous, stage "Operational Environment", but which failed to react by fusion, and were exhausted from the first stage Environment at 9, would be separated by gaseous diffusion from the Helium fusion products and recycled ("Recycle") as "fuel" to a second, or subsequent, stage "Operational Environment".

After the end products are exhausted, the bombardment control grid B is sequenced through a second subcycle releasing a second wave of nuclei in a pre-postioned array; and this is, in turn, accelerated by a much smaller acceleration potential which is designed to induce just the velocity necessary to ensure that the array arrives at the target lattice T properly aligned and with enough kinetic energy to effect an insertion of the second-wave bombardment nuclei into the outermost layers of interstitial sites of the target lattice. Excess kinetic energy is absorbed by the lattice and appears as recoverable heat. During this target lattice recharging cycle the Expulsion Control Grid is kept at zero potential and the Exhaust Control Grids is kept at a steady potential to act as a gate preventing the backflow of fusion products from previous fusion cycles.

The system is processed repetitiously through series of the above steps. The refrigerant flow is kept controlled at a rate to prevent wide fluctuations of temperature that may induce stress or dislocation of the target lattice.

Prior to any production run of the system, moreover, the target lattice is subjected to an extended duration of low velocity Deuteron bombardment, to introduce a Deuterium ion into every "active" interior interstitial site of the target lattice. Interior interstitial sites not desired for use as "active" sites would be pre-loaded with the mono-protonic isotope of hydrogen to the greatest extent possible, subsequently filling still remaining empty sites with deuterium. This is deemed to be at least desirable (if not absolutely necessary) to induce the proper degree of rigidity into the lattice for pre-venting empty interstitial sites that would allow for an elastic scattering and recoil of a bombardment nuclei during production operations or leave the lattice too elastic to assist in pre-cluding undesirable decay modes of the fusion end products.

The design and fabrication of the target lattice T–T of the invention for use by bombardment with ions of Deuterium or Muonic Hydrogen for the purpose of inducing nuclear reactions, including fusion reactions, between the bombardment nuclei and a target nuclei already pre-positioned within the target lattice is appropriate whether such bombardment nuclei is projected on a trajectory into the target lattice by the use of electrical or magnetic fields, or, indeed, by use of aqueous solutions under the influence of electrical fields, or further by use of hyperbaric atmospheres of Deuterium or Muonic Hydrogen.

The problem anticipated (and solved) by this design is the shearing effect upon a metallic lattice by nuclear fusion reactions occurring within the body of a metallic lattice of the heavy metal. Such shearing effect beneath a surface layer of the lattice would cause the atoms of the metallic lattice to erode away during the operation of the lattice for the beneficial production of energy, with such erosions removing first those atoms along a transverse wall as shown in FIG. 3A. This renders ever increasing portions of the lattice weakened, and insufficiently rigid properly to control the fusion reaction process to prevent undesirable modes of reaction products, including free neutrons from being released. Thus the lattice rapidly decays, numerous interstitial sites become "elastic" as opposed to "rigid", and massive numbers of free neutrons are released by the fusion process.

As before explained, in accordance with preferred aspects of the invention, the solution to this problem lies in astute use of geometry, with the design of such a target lattice having a geometry on the face of the lattice where the bombardment nuclei, however induced into bombardment, enter that lattice; such that the region intended for the active inducement of fusion reactions has a step-wise cavitation or depression as shown in FIG. 3B. The active Interstitial sites are denoted by periods shown as "." in the first four layers of the target area. However, it is imperative to remember that all of the interstitial sites within the entire lattice are pre-populated with Hydrogen Isotope ions prior to operation of the lattice for the beneficial production of energy.

The cavitation or depression is created to establish a border region of the lattice comprised of atoms of heavy metal whose dimensions of atomic radius and propensity to form "closest packed lattices" is utilized to structure an array of interstitial sites within such a metal lattice that will accommodate the inclusion of an ion or neutral atom of Deuterium, mono-protonic, or Muonic Hydrogen, as previously outlined.

The greater depth of the border area relative to the depth of the active target area, allows the distribution of shearing forces from the smaller number of atoms located adjacent to the interstitial sites where fusion is taking place to the much greater number of atoms of the lattice along the border areas. This will allow the absolute strength of the shearing forces resulting for one or a number of fusion reactions acting upon a given atom of the lattice to drop below the adhesive strength of the lattice, preventing the destructive erosion of the lattice during its use for the beneficial production of energy.

A suitable technique for fabricating such a lattice structure will now be described.

The border region is left in a condition of being on the same height (or depth) of the lattice as the lattice is shaped in the from of a rectilinear solid. With the rectilinear solid trimmed or shaped to have smooth sides along the axis planes of the metallic crystalline lattice, one or more such surfaces on an axis plane of the lattice is (are) chosen to be the future target surface(s). Portions of each of the intended target surfaces are then chosen to act as "active target areas", with an intermediate annulus about the active target area chosen as the "step-wise cavitation", and the remaining exterior annulus portion of the surface retained as "border areas".

The "border areas" are then masked in such a manner as to preclude the corrosive or erosive effects applied to the "active target area" and the "step-wise cavitation" The remaining unmasked areas, being the intended "target area" and the entire "step-wise cavitation" region are etched by a corrosive or erosive process, with the etching process being permitted to occur to the extent that only a small number of atomic layers of the lattice are removed from the etched regions.

Thereupon, the masking is extended from the "border region" into the outer annulus of the "step-wise cavitation", precluding any further etching processes acting upon an outer-most "first step". The linear dimension of breadth of the extension of the masking is kept constant about the entire perimeter of the "step-wise cavitation", and a second process of etching by corrosion or erosion is performed.

The process of masking the exterior annulus of the previously etched region is repeated numerous times, resulting in the final product. The target lattice at the border region is numerous atomic layers thicker than at the target region, and multiple "steps" exist along the entire perimeter of the target area, each step being from one to a small number of atomic layers thick, and the surface breadth of each step is kept as nearly constant as possible around the perimeter.

THEORETICAL ANALYSIS

Turning more specifically to the preferred polyhedron target lattice structure before-described, reference may be made, for example, to *University Chemistry*, authored by Dr. Bruce Mahan, published by Addison-Wesley Publishing Company, Inc., and copyrighted in 1965 for close-packing lattice criteria in general.

First, the above-listed metals which are feasible for use as the primary lattice constituents or as dopants have an atomic radius between 1.23 and 1.31 Angstroms, consistent with the containment of a Hydrogen (or Deuterium) atom imbedded at an interstitial site;

Second, all of the metals which are feasible for use in either capacity form "Closely Packed Lattices" in their pure state, of which there are two forms: "Hexagonal Closest Packed" and "Cubic Closest Packed" as discussed in the Mahan text.

Third, each metal which is feasible for use in either capacity is notably spherical in the shape of its outermost electron orbitals; each of the metals has a ground state of either an S-orbital (angular momentum quantum number equal zero) or a D-orbital (permissible angular momentum quantum numbers of −2, −1, 0, +1, and +2) which when overlaid upon one another with a large compliment of electrons, lead to a very spherical outer electron transition layer;

Fourth, when the distinction is drawn between elements which are suitable for the higher standard of being the primary lattice constituents, the observations of the second and third points immediately become even more pronounced. The more limited set of metals are all inclined to produce "Cubic Closest Packed" lattices, and the D-orbitals are always full up to the sub-orbital having an angular momentum quantum number of +2.

At this point, it is clear that the metals having the most spherical outer electron boundary are those suitable as the primary lattice constituents, and it is the sphericity of the electron boundary that gives rise to the formation of "Cubic Closest Packed" lattices, as explained on pages 94 and 95 of the said Mahan text, with "a,b,c" sites for packing. The distortions from a true spherical shape of the electron boundary of the metals leads the first layer of the lattice to have a pattern of "protuberances" or "depressions" in the electron boundaries between the first and second layers, which causes a symmetric distortion in the electron boundary of the second layer. Then, when the third layer is added, the interstitial sites labelled "b" and "c" are no longer equal. The sites "c" may be infused with the "protuberances" produced by the proximity of the first and second layers, raising the probability of finding an electron "sometimes" within the "c" sites. This in turn raises the Coulomb potential energy of the "c" sites, as opposed to the otherwise symmetrical "a" and "b" sites. Ergo, the next atoms added will avoid the "c" sites and the lattice will crystallize in the pattern cited by the text as "ababab . . . " or Hexagonal Closest Packed.

The more perfectly spherically atoms, on the other hand, are able to create a state of lowest energy by the equal selection of all three types of sites, "a", "b", and "c", resulting in Cubic Closest Packed.

From pages 371 and 372 of the said text, furthermore, it is clear that the D-orbitals which are labelled as:

are the most crucial. It is further clear that the layer of interstitial sites between the two outermost surface layers of the lattice is the most important because a lattice metal atom in the second layer is situated (perfectly centered) behind each of the identified sites. Thus the site containing a target Deuteron is bounded on five of six "cubic" sides by a massive atom; that is, "massive" in comparison to the mass of Deuterium. The sixth side is the open face through which a bombardment nucleon (deuterium or Muonic Hydrogen) would be guided by the electron fields of the lattice metal atoms, direct to a "bulls-eye".

Reference may be made to the further textbook, *Introduction to Solid State Physics, Third Edition*, authored by Charles Kittel and published by John Wiley & Sons, Inc., 1968, for general theoretical background on phonons and lattice vibrations (Chapter 5, pages 135, 147).

While not dependent upon particular exact theories of operation, the invention being disclosed as specific apparatus and operational steps irrespective of which refinement of theory explaining the operation turns out to be more correct, it may still be helpful to consider such theories.

To make the technical points earlier raised in this connection even more clear, the "phonon" is a mathematical construct used to simplify the treatment of quantized energy of elastic waves in solid state materials, in a manner analogous to the quantum of electromagnetic energy known as the "photon". In the general treatment of "phonons", it is recognized that only the mode of phonons referred to as "K=0" is able actually to transmit physical momentum. This is due to the fact that only the "K=0" terms are based upon coordinates that are "Center-of-Mass coordinates"; and it has been previously pointed out in this application that it is the Conservation of Momentum in the Center-of-Mass systems that compels the disintegration of the Helium-4 nucleus once fusion has occurred.

Within the system of FIGS. 1 and 2, however, the energy released by the fusion reaction, and the momentum carried into the reaction by the original bombardment particle(s) is transmitted into the Palladium (or other confinement) lattice by longitudinal compression waves similar to the neutron scattering shown in the Kittel textbook as the most elementary case. These longitudinal compression waves are of the "K=0" mode, and carry actual physical momentum.

There are three assumptions implicit in extending the neutron scattering example to the "post-fusion" situation.

First, the neutron scattering case presumes that the incoming neutron has significant momentum due to a very high velocity almost equal to the speed of light (v=c); the assumption being made for the purposes of this analysis is that the doubled mass of the Deuteron accelerated for the purposes of fusion has so much momentum that it does not result in a significantly different situation.

Second, the neutron scattering case presumes that the scattering event itself is "inelastic"; that is, nonbinding, non-absorbing, and between particles which are greatly different in mass (weight). This will still hold true for Deuterons or Helium-4 nuclei compared to the mass of a Palladium atom. The same is true if Ruthenium, Rhodium or Tungsten through Platinum are involved; but it is not necessarily true if the lattice is composed of lighter Aluminum—another potentially fatal flaw to the use of Aluminum; while Zinc would be a borderline situation.

Third, considering the velocity of an incoming Deuteron, or the elevated kinetic energy of a Helium-4 nuclei after fusion has occurred, the single or double positive coulomb (electrical) charge, respectively, will not provide such a repulsion from the Palladium (or other lattice metal) through the electromagnetic field of the Palladium nucleus as to eliminate the "neutron scattering" effect. While the electrical fields will certainly have an effect, the energies involved are extremely high and a scattering trajectory of the Deuteron or the Helium-4 nuclei will come very close to the nucleus of the Palladium (or other lattice metal).

Thus, the basic mechanism outlined in the Kittel textbook will still occur for the phonon-neutron scattering to be fully in effect; momentum transfer would appear through "K=0" mode longitudinal compression waves from the surface (or the outermost layers of interior interstitial sites) of the lattice deeper into the interior of the lattice.

The original momentum of the incident bombardment Deuteron will be transmitted into the Palladium (or other lattice metal) atom situated directly behind the target Deuteron. While the kinetic energy released by the fusion reaction will be transmitted in equal measure to the four Palladium (or other lattice metal) atoms which are "nearest neighbors" to the interstitial site at that layer of the lattice. This latter effect is due to the requirement that the kinetic energy released by the fusion reaction had no prior existing corresponding momentum in any one direction.

In order to preserve the Conservation of Momentum while this massive amount of kinetic energy is transferred, the energy must be transferred in equal amounts along opposite vectors. Then the relativistic relationship between energy and momentum can be observed ($|p|=E/c$), the energy is fully transmitted, and the vector sums of the momentum resulting from the fusion is zero, both before and after the fusion reaction.

This will result in a longitudinal compression wave into those four nearest neighbors which is perpendicular to the original trajectory of the bombardment particle(s). And this in turn means a shearing effect of stripping the surface layer nearest neighbors off of the surface of the lattice T.

This is successfully prevented in accordance with the invention by having corresponding fusion reactions occurring on all sides of the surface layer atoms at the same time. In that situation, the shearing effects are counterbalanced one-opposite-another until reaching the projection (or shadow) of the edge of the bombardment ion array. Then, reliance is based upon having the physical dimensions of the target lattice extend much further in each of the four surface coordinates beyond the active region of the bombardment particle array. Each of the interstitial sites in the extended zone will be kept filled with Deuterons (or other isotopes of Hydrogen) to maintain the desired degree of "rigidity" in the lattice—and to facilitate the dispersion of the shear stresses.

With sides 11 of the target lattice T-T' preferably further shaped, as before stated, as a partially completed Egyptian pyramid with receding steps of target lattice material (and the sides and steps of the lattice further treated with carbon and other diffusion preventatives), FIGS. 3A and 3B, these objectives are attained, such compensatory steps protecting the surface layer of the target lattice from being sheared off.

As a modification to the present invention, a composite system may be constructed of two operational environments, as shown in FIGS. 1 and 2, with one environment attached to the conformal magnetic field magnet above the magnetic field electrical windings M, FIG. 2, and the second environment inverted and attached to the same conformal magnetic field electrical windings M, FIG. 2, with a separate set of conformal magnetic field pole pieces like M1 and M2 aligned along the same plane which bisects both the conformal magnetic field of the first operating environment and the jointly shared electrical windings M. Thus the electrical power consumed to generate a rapidly changing conformal magnetic field for the first operating environment is put to maximum beneficial use in that geometry which prevents or minimizes mutual interactions of the magnetic fields created within each operating environment which would destructively interfere with desirable operation of the invention.

OPERATIONAL PARAMETERS

Preferred constructional details and operational parameters for the system of the embodiments described in connection with the drawings will now be presented, it being understood that these are considered to be the best modes of operation though variations therefrom are possible for less efficient results, if desired.

The concentration of Deuterium versus other isotopes of Hydrogen in front of the Heavy Water Dissociation Cell (or the Deuterium Vapor Barrier Wall) is:

A minimum of two-thirds Deuterium to one-third monoprotonic Hydrogen up to a maximum of one-hundred percent Deuterium versus zero percent alternate isotopes of Hydrogen; in all circumstances, the concentration of the Tritium isotope of Hydrogen should be kept at zero.

The design rationale is simple, any lesser concentration of Deuterium will result in energy applied to accelerate ions of Hydrogen which will fail to result in a fusion reaction. Though of course, operation is possible with less than desirable concentrations of Deuterium though such would waste electrical energy by accelerating an ion known in advance not to produce a fusion reaction. Theoretical rationales which would justify such lower concentrations of Deuterium may be to moderate temperature, or dissociation current and voltage, variations within the dissociation cell C. Any use of Tritium will result in the release of free neutrons in the fusion and post-fusion nuclear reactions, both alternatives are to be avoided as devoutly as possible.

The composition of both the Heavy Water Dissociation Cell (or Deuterium Vapor Barrier Wall) Diffusion Grid D, from which Deuterium ions are accelerated to the Target Lattice T-T', and the Target Lattice is preferably a Palladium metal crystalline lattice. Both the component from which the ions are accelerated and the Target Lattice should have the same doping, or total lack of doping, as provided by the before-described "heavy metals". The thickness of the Heavy Water Dissociation Cell (or Deuterium Vapor Barrier Wall) Diffusion Grid D should be as thin as possible within the design limitation that the Diffusion Grid must remain rigidly perpendicular to the axis of the conformal mapping magnetic field, at the surface of the Diffusion Grid. The Diffusion Grid D may be convex or concave so long as the conformal mapping magnetic field is likewise and exactly convex or concave, at the external face of the Diffusion Grid which faces the Fusion Target Block, such that the Diffusion Grid and the Conformal Mapping Magnetic Field are perpendicular. Thermal deformations due to the pressure of Deuterium ion vapor or Heavy Water under dissociation must be prevented or the Conformal Mapping Magnetic Field must be adjusted in alignment and field strength to map the magnetic field perpendicular to the Diffusion Grid surface.

The thickness of the Fusion Target Block T–T' is also preferably as thin as possible within the design limitation that the Fusion Target Block must remain rigidly perpendicular to the axis of the conformal mapping magnetic field, at the surface of Fusion Target Block.

The cross-section of the Heavy Water Dissociation Cell (or the Deuterium Vapor Barrier Wall), the face of both the Diffusion Grid D and the Fusion Target Block T–T' is desirably square, as that geometry provides the most efficient use the Conformal Mapping Magnetic Field, in concert with the accelerating electric fields, and the transfer of heat from the Fusion Target Block to a Refrigerant Flow behind the Fusion Target Block.

It is further desirable to keep the chamber volume between the Diffusion Grid and the Fusion Target Block at the greatest level of vacuum which can be economically maintained.

The Acceleration Grids are preferably composed of any metal which conducts electricity with a low electrical resistance, such as Copper, Silver, Gold, or Aluminum, or a super-conducting thin film composed, in whole or in part, of Niobium, Gallium, Yttrium, Osmium, or Iridium. The Acceleration Grids may be a fine wire mesh, provided that the axial cross-section of each Grid matches the axial cross-section of all other Acceleration Grids within the vacuum controlled contained-environment of the longitudinal housing. This will prevent a subsequent grid from presenting a barrier to the passage of ions to the Fusion Target Block once the ion has made a transit past the first such grid.

A useful voltage to be used to accelerate the ions from the Diffusion Grid D into the Fusion Target Block T–T' is in the range of twenty thousand to fifty thousand volts. The voltage potentials which will appear upon the Bombardment Control Grid, Focus Control Grids, and the Acceleration Control Grid(s) will range from negative 50,000 volts to positive 50,000 volts. The system may, of course, be operated with other voltage ranges, but the above are considered preferable.

The desired operational temperature range to be maintained in the Refrigerant Flow is 900–1000 degrees Fahrenheit.

The Magnetic Flux applied to the system is the variable control feature which is adjusted in concert with the Focus Control Grid voltage potentials to create a family of functional operating parameter regimes. The bombardment trajectory of the accelerated ions is, as previously described, a spiral about a tube of magnetic flux, which tube may contain a single quantum line of magnetic flux, or many quantum lines of flux so long as the density of magnetic flux is constant across the face of the Diffusion Grid or Grating at the surface of the Diffusion Grid or Grating.

For example only, to control a Deuterium ion accelerated to 50,000 eV (electron-Volts), a field of one (1) Kilogauss which would require an input power of approximately 2 Kilowatts, would result in a radius of the spiral on the order of fifty (50) centimeters. Such a Magnetic Flux Density level can then be chosen to conform to the previously determined physical dimensions of the Diffusion Grid or Grating and the Fusion Target Block.

To continue with this example, the design could be made, using the energy and Magnetic Field Density stated above, by choosing the cross-section of the Diffusion Grating or Grid D to be fifty (50) centimeters in each axis, centered on the center-point of the Fusion Target Block T–T', which would have a cross-section of one-and-a-half (1.5) meters. Thus, the spiral path of any bombardment ion would result in it (and all other bombardment ions) arriving at an interstitial site in the lattice of the Fusion Target Block. It is to be understood that these parameters are stated as an illustrative example only.

For any single Magnetic Flux level of the Conformal Mapping Magnetic Field, there are many different settings of the Focus Control Grid voltage potentials which will induce the fusion reactions to occur. This is done by inducing a translation (up and down, or left and right) in the plane perpendicular (normal) to the transit of accelerated ions from the Diffusion Grid or Grating D to the surface layer of the Fusion Target Block T–T'. The actual physical translation needed in either axis is plus or minus the diameter of a Palladium atom. This arises because there occurs six Palladium lattice interstitial sites on the surface layer of the Fusion Target Block within the dimensions of one atomic diameter from the center of any given Palladium lattice.

The emission pattern which is initiated at the Diffusion Grid or Grating D is a repeated pattern of Palladium lattice interstitial sites, the bombardment trajectory of each of the accelerated ions is a spiral about a tube of magnetic flux, which deposits the accelerated ion at a corresponding repeated pattern of Palladium lattice interstitial sites. As the emission pattern of the Diffusion Grid or Grating is a repeated pattern of Palladium lattice interstitial sites, there is no requirement that only a specific interstitial site in the Fusion Target Block can be used. Every bombardment ion is "rifled" into its corresponding target ion.

When the Focus Control Grids are set to any potential which will induce any one bombardment ion to arrive at any corresponding interstitial site in the Fusion Target Block, then all bombardment ions which were emitted from the Diffusion Grid or Grating D during that operating cycle are likewise mapped into a target ion situated at an interstitial lattice site in the Fusion Target Block T–T'.

The operating regime then, by its intrinsic design, produces an all-or-nothing rate of fusion reactions among the bombardment ions emitted from the Diffusion Grid or Grating D during each operation cycle.

Radiation measuring devices commonly used in the art of inducing nuclear reactions are then used to identify the presence or absence of fusion reactions.

The technique of the invention involves, thus, a three-stage process of impregnation, bombardment (inducement of fusion and transfer of heat), and removal and exhaustion of end products (Helium and unused Hydrogen ions which were not properly targeted). The impregnation process is designed to take less than one second as the impregnation must occur only as deep as the third atomic layer of the Palladium lattice of the Fusion Target Block. The optimal design objective, indeed, is to tune the expulsion process sufficiently fine so as to expunge interstitial lattice sites at only the first atomic layer; but the device, as described, will operate at less than that optimum. By minimizing the depth of expulsion, subsequent impregnation stages will require migration of target ions to only the first layer of interstitial sites. The targeting systems composed of the interstitial lattice sites of the Diffusion Grating or Grid D, the Conformal Mapping Magnetic Field F, and the corresponding interstitial lattice sites of the Fusion Target Block T–T', moreover, will substantially limit active fusion reactions to the first layer of interstitial lattice sites of the Fusion Target Block.

The bombardment stage will also take less than a second, but there will be an intentional delay to initiate the exhaust stage so as efficiently to transfer heat from the Fusion Target Block T–T' to the Refrigerant R before subjecting the face of the Fusion Target Block T to applied microwave and optical laser excitation tuned to the nuclear resonances of Helium isotopes. The optimal duration of the time delay between the bombardment stage and the exhaust stage will be determined as an economic operating characteristic. The exhaust stage will take less than a second to excite the Helium nuclei that were created as a result of the fusion reactions.

The energy applied to operate the system is dominated by the power consumed by the conformal mapping magnetic field, which in turn is, as before noted, an economic decision as the the scale of the device to be built. Strictly as an example, a unit containing a one-half (0.5) meter square Diffusion Grating or Grid, a one-and-a-half (1.5) meter Fusion Target Block, approximately four (4) meters long, two (2) meters tall, two (2) meters wide, and having a Conformal Mapping Magnetic Field of with a Magnetic Field Density of approximately of one (1) Kilogauss, would require an input power of approximately 2 Kilowatts (2 KW) for the magnetic field and five hundred watts (500 Watt) for the acceleration and control grids, and dissociation of Deuterium from heavy water. The economically usable output power would be approximately two megawatts (2 MW). The utilization of super-conducting magnets may greatly reduce the input power consumption.

Further modifications will occur to those skilled in the art, including the use in the system of the invention of variations in types of magnetic field generation, electrode and grid structures and placements, and other electrical and electromagnetic charged ion and sub-atomic particle field-controlling systems, including arrays of point or line electrical conductors in a semicircular or parabolic pattern to create an electrical or electromagnetic mirror with parabolic lines of electrical equipotential, or rings or disks to which voltage is applied to create equipotential lines in parabolic form with common focal point; such being considered to fall with the spirit and scope of the invention as defined in the appended claims.

What is claimed is:

1. A method of producing and controlling energy, that comprises, providing along a transversely extending diffusion/emission grid surface and within an evacuated contained environment an array of Hydrogen ions at the interstitial sites of the grid surface; electronically accelerating the array of ions along a longitudinal direction substantially normal to said surface toward a transversely extending lattice surface of a heavy metal of atomic radius between about 1.23 and 1.31 Angstroms; generating magnetic lines of flux along said direction between said diffusion/emission grid surface and target lattice surface; substantially matching the interstitial sites on said grid surface with corresponding interstitial sites on the surface of the target lattice; and controlling the acceleration of the said ions as an array from said diffusion/emission grid surface and the individual ion precession along said magnetic lines of flux to impact the Hydrogen ions array upon the corresponding target lattice surface interstitial sites so as to bombard ions that may be already positioned at the corresponding target surface or interior lattice interstitial sites or, if no such ion is already so positioned, to insert an ion into such surface or interior interstitial site of the target lattice for future reaction with a bombardment ion.

2. A method as claimed in claim 1 and in which said diffusion/emission grid surface is disposed together and in contact with a source of Hydrogen ions diffused at the diffusion/emission grid surface, the source being selected from one of a heavy water dissociation cell or a deuterium ion vapor chamber.

3. A method as claimed in claim 2 and in which said Hydrogen ions are selectively diffused through the said grid surface while blocking all atoms larger than Helium and varying in the degree and selectivity to which Helium is allowed to diffuse.

4. A method as claimed in claim 2 and in which hydrogen isotope migration is obstructed beyond the target lattice to retain hydrogen isotope ions occupying target lattice interstitial sites.

5. A method as claimed in claim 2 and in which the magnetic lines of flux induce said ion precession to control the trajectories of the ions from an interstitial site on the surface of the said grid and a uniquely corresponding interstitial site on the surface of the target lattice.

6. A method as claimed in claim 5 and in which the precessing accelerated ions are focussed as an array upon the surface of the target lattice.

7. A method as claimed in claim 2 and in which a field is impressed upon the target lattice stimulating the diffusion or emission of Helium and other fusion end products from the surface thereof and the same are exhausted from the contained environment.

8. A method as claimed in claim 2 and in which the metallic crystalline lattice of the target is doped to modify the existing ionic distances between adjacent atoms.

9. A method as claimed in claim 2 and in which nuclei of Hydrogen isotopes are introduced and impregnated into the target lattice interior interstitial sites to induce greater rigidity and reduce the capacity of the lattice to respond elastically to collision by Hydrogen isotope nuclei and Helium fusion product nuclei.

10. A method as claimed in claim 2 and in which said metal is selected from the group consisting of aluminum, gallium, iridium, molybdenum, osmium, palladium, platinum, rhenium, rhodium, ruthenium, tungsten, and zinc.

11. A system for producing and controlling energy that comprises, a longitudinally extending housing provided with magnetic field producing means for providing magnetic flux lines directed longitudinally along the housing; means for producing hydrogen ions and diffusing or emitting the same as an array of ions along the inherent interstitial sites of a diffusion/emission grid means transversely disposed across the housing; a transversely extending target lattice surface of a heavy metal of atomic radius between about 1.23 and 1.31 Angstroms disposed at a distance along the housing longitudinally displaced from the diffusion/emission grid means; the said interstitial sites of the said diffusion/emission grid means being adjusted to correspond to the interstitial sites of the said target lattice surface; further transversely extending grid means disposed between the diffusion/emission grid and the target lattice surface for accelerating and focusing the array of ions precessing along the magnetic flux lines to impact the hydrogen ions array upon the corresponding target lattice surface interstitial sites so as to bombard ions that may be already positioned at the corresponding target lattice interstitial sites; or, to penetrate to impact the Hydrogen ion array located in corresponding target lattice interior interstitial sites so as to bombard ions that may be already positioned at the corresponding target lattice interior interstitial sites; or, if no such ion is already positioned, to insert an ion into such interior interstitial site of the target lattice for future reaction with a bombarding ion.

12. A system as claimed in claim 11 and in which heavy water dissociation cell means is disposed in contact with said diffusion/emission grid means to diffuse the said array of hydrogen ions therethrough.

13. A system as claimed in claim 12 and in which said cell operates with platinum or palladium electrode anode means and a porous filter in contact with the heavy water solution and dividing the cell anode from the diffusion/emission grid means, serving as cell cathode, to prevent accidental admixture of ionic hydrogen and ionic oxygen in the gaseous state.

14. A system as claimed in claim 11 and in which a deuterium ion vapor chamber is disposed in contact with said diffusion/emission grid means to diffuse the said array of the hydrogen ions therethrough.

15. A system for producing and controlling energy that comprises, a longitudinally extending housing provided with magnetic field producing means for providing magnetic flux lines directed longitudinally along the housing; means for producing hydrogen ions and diffusing or emitting the same as an array of ions along the inherent interstitial sites of a diffusion/emission grid means transversely disposed across the housing; a transversely extending target lattice surface of a heavy metal of atomic radius between about 1.23 and 1.31 Angstroms disposed at a distance along the housing longitudinally displaced from the diffusion/emission grid means; the said interstitial sites of the said diffusion/emission grid means being adjusted to correspond to the interstitial sites of the said target lattice surface; further transversely extending grid means disposed between the diffusion/emission grid and the target lattice surface for accelerating and focusing the array of ions precessing along the magnetic flux lines to impact the hydrogen ions array upon the corresponding target lattice surface interstitial sites so as to bombard ions that may be already positioned at the corresponding target lattice interstitial sites; or, to penetrate to impact the Hydrogen ion array located in corresponding target lattice interior interstitial sites so as to bombard ions that may be already positioned at the corresponding target lattice interior interstitial sites; or, if no such ion is already positioned, to insert an ion into such interior interstitial site of the target lattice for future reaction with a bombarding ion, and in which the said further grid means comprise one or more of a transverse bombardment control grid disposed following the said diffusion/emission grid means to preclude the passage of positively charged particles therebeyond; acceleration control grid means; focusing grid means; expulsion control grid means disposed near the target lattice surface for stimulating the diffusion or emission of helium and other end products from the surface of the target lattice surface.

16. A system as claimed in claim 15 and in which an electrical pulse control system is provided for applying one or more of the following appropriate transient control states to effect operations steps: negative and then neutral potential for said bombardment control grid means relative to said diffusion/emission grid means; negative, then neutral and then positive potential to the said acceleration control grid means relative to the said bombardment control grid means; oppositely negative and positive and then neutral electrical states relative to the charges of the hydrogen ions to the said focus control grids; and negative and positive voltage oscillating at radio, microwave, or optical frequencies to establish fields stimulating, attracting, and repelling helium nuclei from positions, imbedded within interior interstitial sites, and adhering to surface interstitial sites, of the target lattice.

17. A system as claimed in claim 11 and in which means is provided for pre-conditioning the target lattice by controlling the acceleration imparted to the array of hydrogen ions sufficiently to induce the hydrogen isotope ions to reach the surface of the target lattice at corresponding interstitial sites and adhere thereto and imbed therein, but insufficient acceleration to induce nuclear fusion reactions.

18. A system as claimed in claim 16 and in which the operational voltage application steps are repetitively repeated.

19. A system as claimed in claim 11 and in which the magnetic field strength of the magnetic field producing means is increased in synchronization with the impressed voltages of the acceleration grid means to maintain the one-to-one correspondence of the trajectories of hydrogen ions in the array as the ions traverse the interior of the longitudinally extended housing from the interstitial sites of the diffusion/emission grid to the chosen corresponding interstitial sites of the target lattice.

20. A system as claimed in claim 11 and in which the target lattice surface faces the lattice interior and is formed of one or more of platinum and palladium.

21. A system as claimed in claim 20 and in which metallic dopant material is provided to the target lattice to modify the existing ionic distances between adjacent lattice atoms.

22. A system as claimed in claim 21 and in which the dopant materials are selected from the group consisting of: gallium, iridium, molybdenum, osmium, rhenium, rhodium, ruthenium, tungsten, and zinc.

23. A system as claimed in claim 11 and in which the target lattice is formed with pyramidal or stepped configurations.

24. A system as claimed in claim 11 and in which the target lattice is provided with a hydrogen isotope migration barrier.

25. A system as claimed in claim 24 and in which the barrier material is selected from the group of elements and molecular compounds of berylium, boron and carbon.

26. A system as claimed in claim 23 and in which the active portion of the target lattice front surface is formed into depressions of at least several atomic layers thick.

27. A system as claimed in claim 15 and in which means is provided for separating from the helium fusion end products any hydrogen isotopes and muonic hydrogen that failed to react by fusion at the target lattice.

28. A system for producing and controlling energy comprising a combination of two systems as claimed in claim 11 connected, through a common electro-magnet, to operate in parallel.

29. A method as claimed in claim 9 and in which said nuclei are chosen and selectively introduced and impregnated into the said target lattice interior interstitial sites such that the mono-protonic isotope of Hydrogen is used to impregnate those interstitial sites where it is desired deliberately to preclude a reaction which would result in an unremovable nuclei of Helium that would lead to deformations of the lattice; and the Deuterium isotope of Hydrogen is used to impregnate all interstitial sites at which a reaction resulting in the creation of a Helium nuclei is desired.

* * * * *